United States Patent [19]

Kotlarski

[11] 4,160,249

[45] Jul. 3, 1979

[54] ANALOGUE STORAGE AND PROCESSING SYSTEM

[75] Inventor: Joseph R. Kotlarski, Palos Verdes, Calif.

[73] Assignee: Hughes Aircraft Company, Culver City, Calif.

[21] Appl. No.: 638,696

[22] Filed: May 8, 1967

[51] Int. Cl.² .............................................. G01S 9/44
[52] U.S. Cl. ................................. 343/9 PS; 343/5 PD; 365/45
[58] Field of Search .................. 88/1 HV; 350/160; 250/219 IA, 219 F; 343/5 CM, 7.7, 8, 9, 5 PR; 365/45, 217

[56] References Cited

U.S. PATENT DOCUMENTS

| 3,178,711 | 4/1965 | Case | 343/5 CM |
|---|---|---|---|
| 3,184,679 | 5/1965 | Kuehne | 250/219 F X |
| 3,228,028 | 1/1966 | Baum et al. | 343/5 CM |
| 3,271,765 | 9/1966 | Pulford | 343/5 CM |

Primary Examiner—Maynard R. Wilbur
Assistant Examiner—Richard E. Berger
Attorney, Agent, or Firm—W. H. MacAllister; Walter J. Adam; Lawrence V. Link, Jr.

[57] ABSTRACT

A system for the simultaneous storage of a plurality of components of data signals and for the retrieval and the processing thereof. The system includes a signal source coupled to a record unit that is synchronized by a record controller. A plurality of cathode ray tubes and optical imaging means are included in the record unit for storing the plurality of simultaneously occurring input signal components on a photographic film in an interleaved pattern. A single readout device scans the film in a direction transverse to the record pattern to develop read signals which are processed by a readout processor and an analyzer and then displayed on a display unit. The readout unit synchronizes the readout processor, the analyzer and the display unit.

13 Claims, 11 Drawing Figures

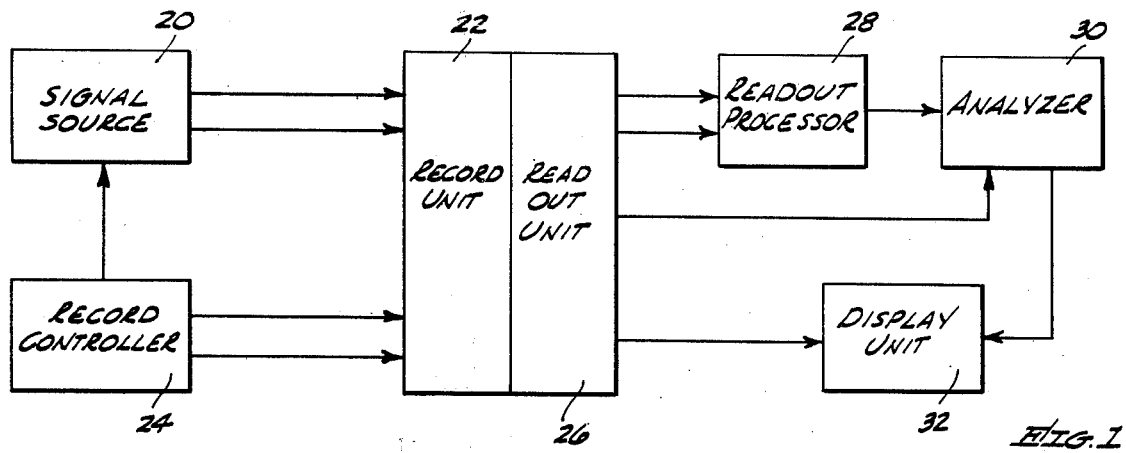
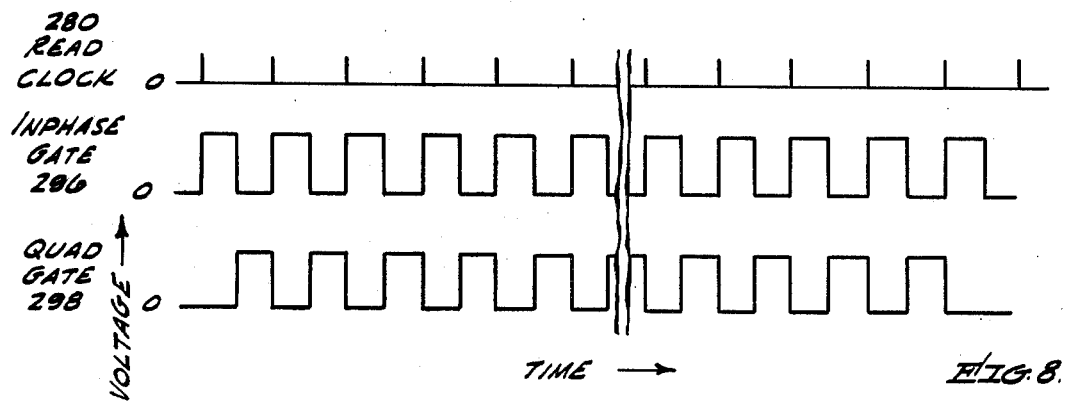
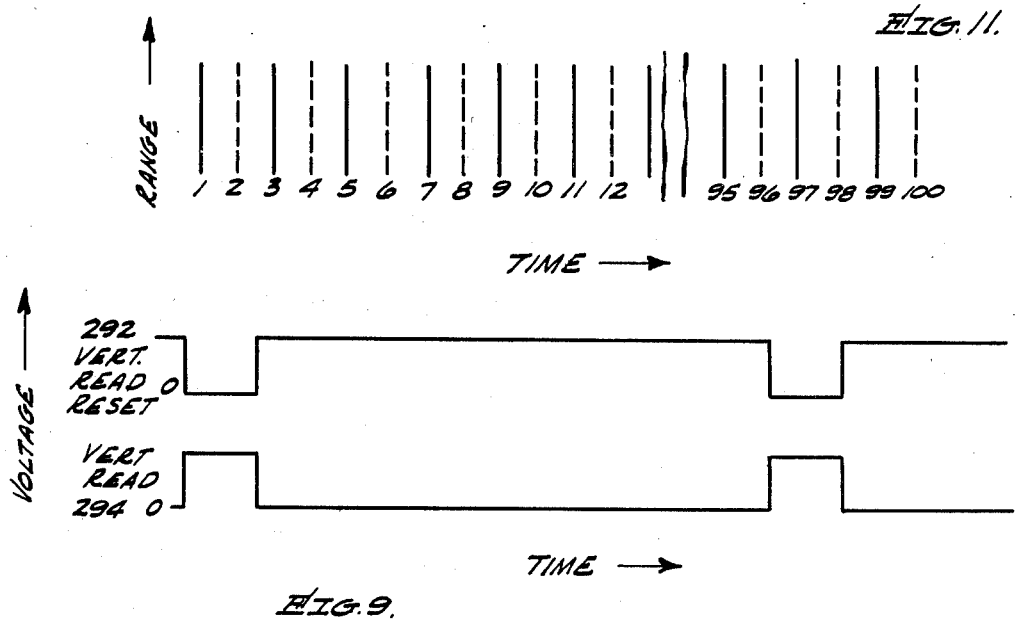

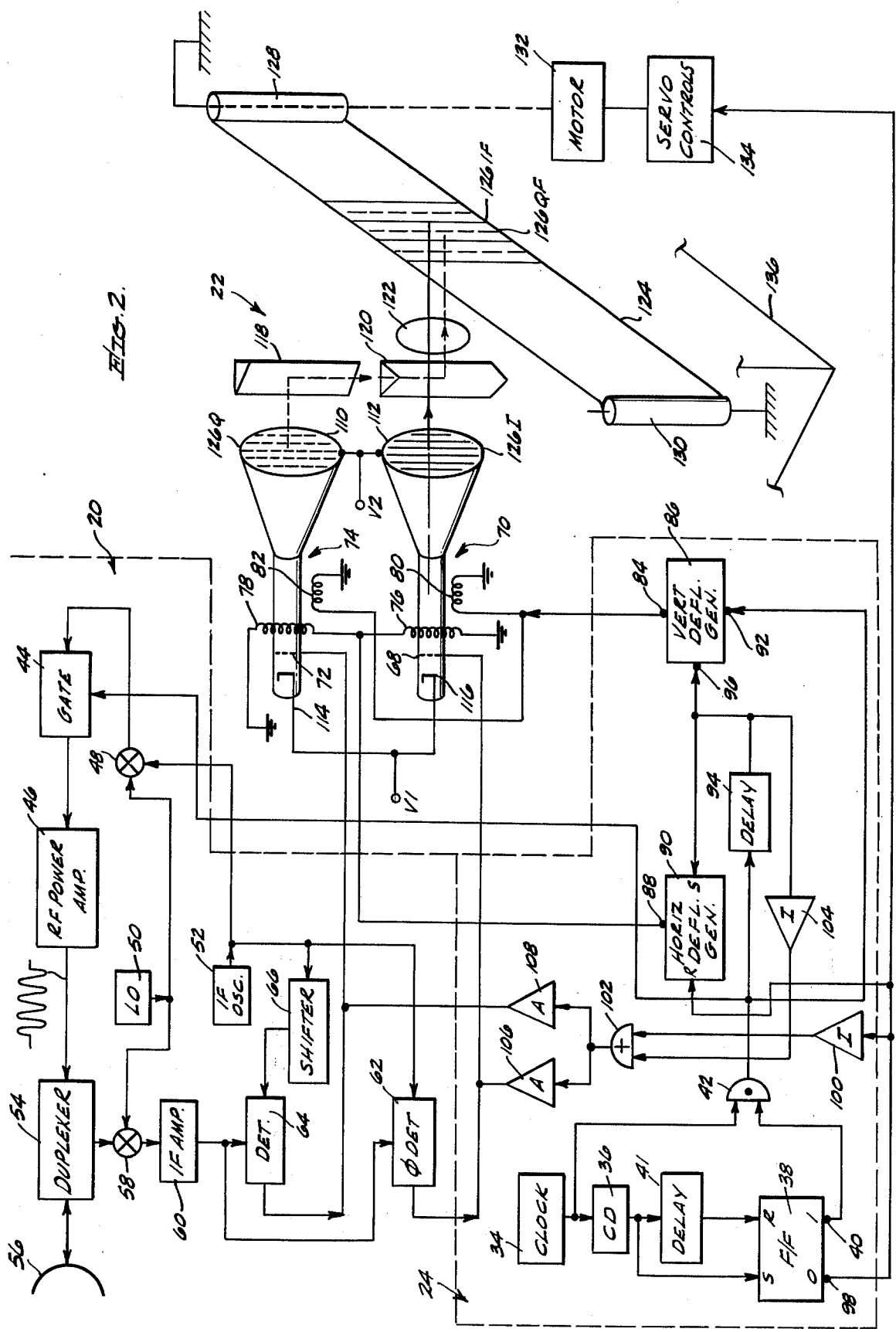

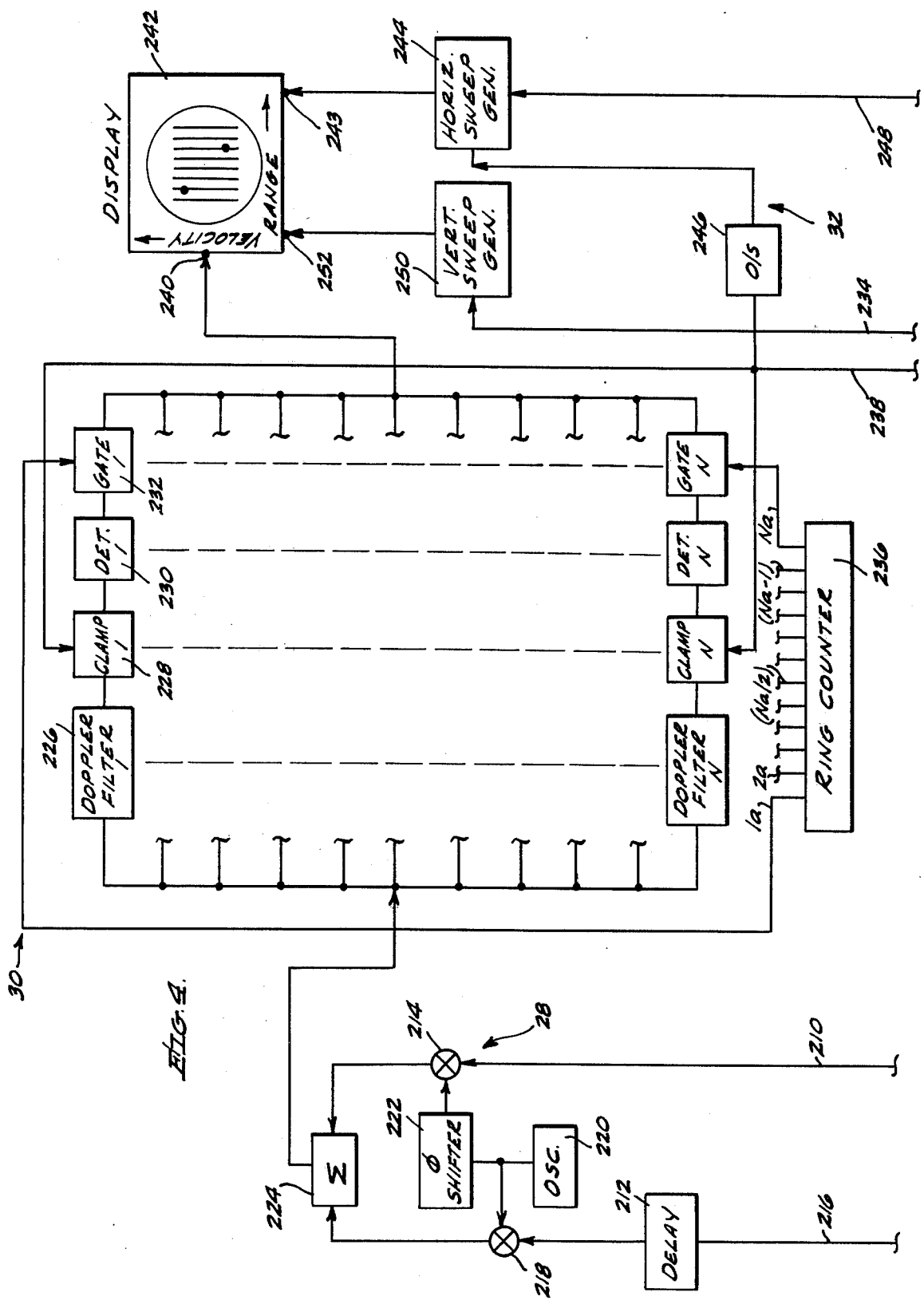

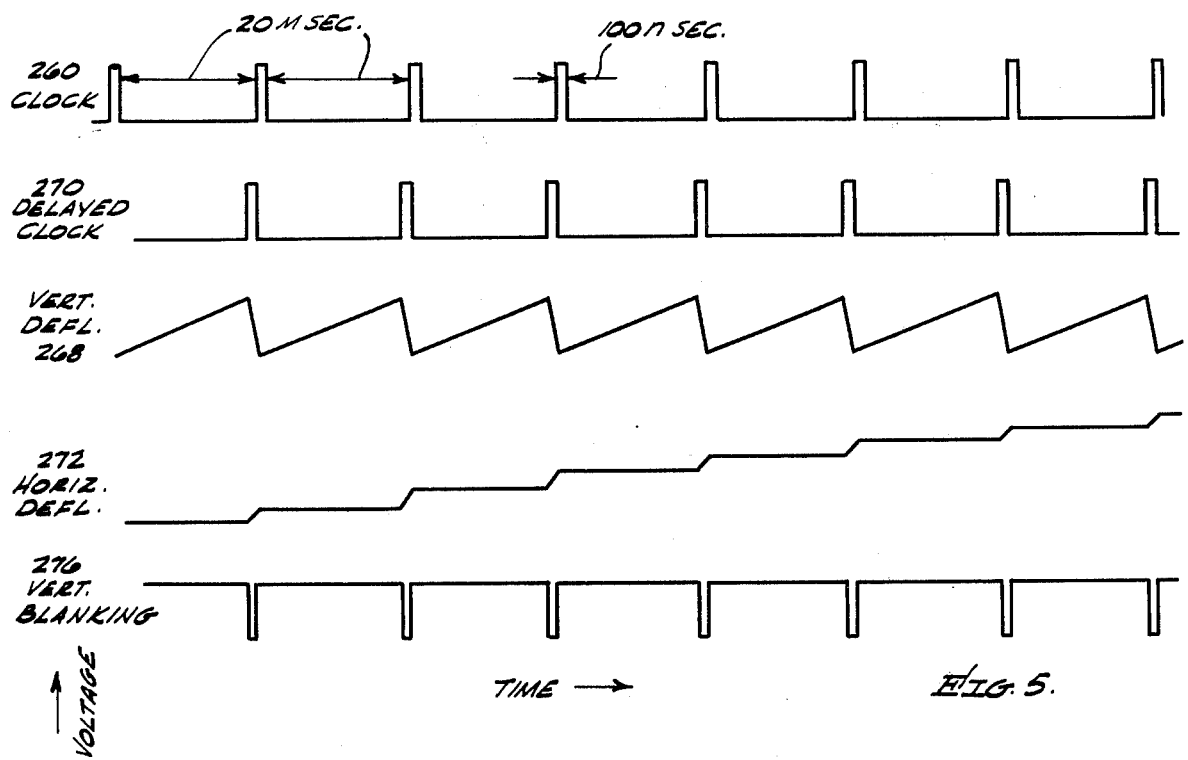
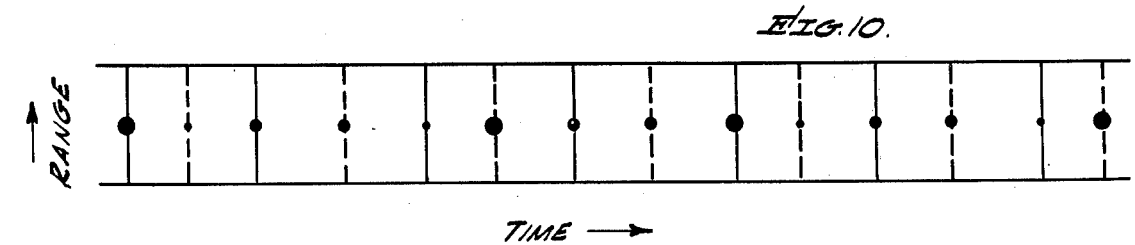
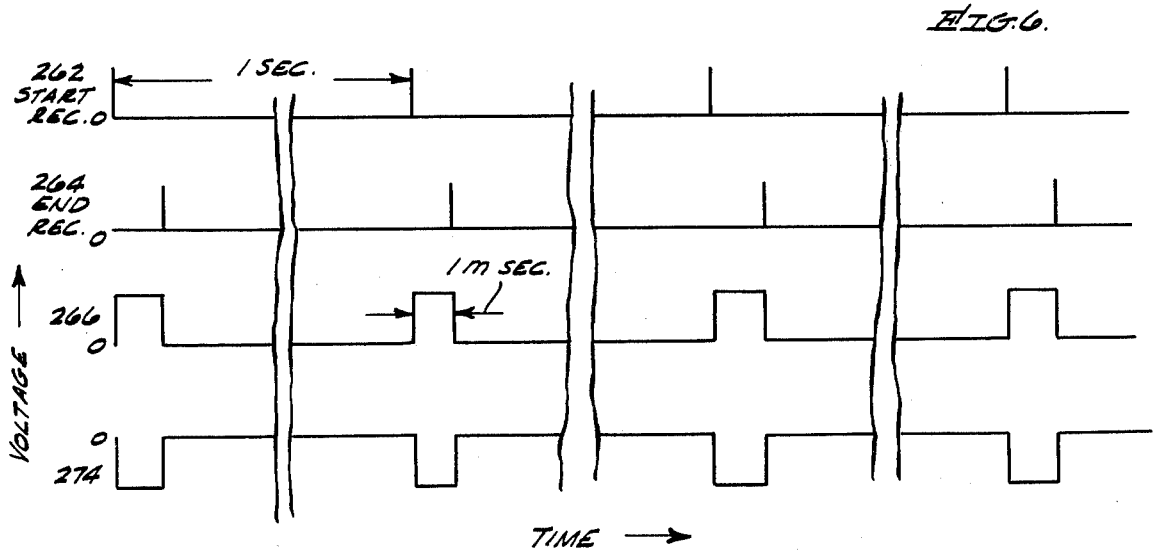

ANALOGUE STORAGE AND PROCESSING SYSTEM

BACKGROUND OF THE INVENTION

This invention relates generally to storage and processing systems, and particularly to systems that may simultaneously record a plurality of components of an analogue data signal and then readout and process the stored data with a high degree of amplitude and phase registration.

Analogue storage and processing systems, such as those utilized in pulse doppler radars for example, determine a target's doppler frequency shift (velocity) by sensing the relative phase variation of successive pulses from a given range. in some prior art systems this doppler frequency determination is accomplished by demodulating the received radar signals and storing the in-phase component thereof along a first dimension of a storage medium which corresponds to target range. After a sufficient doppler history has been recorded in this manner, the storage medium is read out in a direction transverse to the first dimension to develop a read signal at each range interval that vary in frequency as a function of the doppler history of the received target signal.

However, in the just described prior art systems that record only the in-phase component of the received target signal, the maximum unambiguous doppler frequency is limited to one-half the pulse repetition rate of the radar transmitter. Since the maximum unambiguous doppler frequency is directly proportional to the maximum unambiguous target velocity that may be detected it would be desirable to have this unambiguous frequency as high as possible. It has been determined that if the received radar signal is demodulated by quadrature detectors and both the in-phase and quadrature components are stored and processed simultaneously, then an unambiguous doppler frequency up to the pulse repetition frequency of the radar may be realized. A storage and processing system that can accurately store, retrieve and process a plurality of simultaneously occurring signal components would double the velocity determination range of storage type pulse doppler radars and therefore be a great advancement in the signal processing art.

One possible mechanization for storing and processing the in-phase and quadrature radar data components would be to use separate parallel record and readout channels for each of the data components. However since the in-phase and quadrature radar signal components occur simultaneously, extreme care must be exercised so that these signals may be retrieved from storage and recombined without amplitudes or phase distortion degrading the accuracy of the desired doppler history.

SUMMARY OF THE INVENTION

Briefly, this invention is an analogue storage and processing system that records, retrieves and processes a plurality of simultaneously occurring signal components with a minimum of amplitude and phase error. In the system of the invention each signal component modulates the intensity of a separate cathode ray tube electron beam and the resultant light intensity modulation is recorded in an interleaved pattern (i.e., adjacent positions in an alternating sequence) on a photographic film by means of optical imaging lenses. The photographic film, after being developed, is scanned by a single constant intensity readout light beam in a direction transverse to the record pattern. The variation in transmissitivity of the developed film modulates the scanning readout light beam and this light modulation is detected by a photomultiplier tube to produce correspondingly modulated signals. The output signals from the photomultiplier tube are processed by a readout controller wherein the plurality of signal components are separated by suitable gating circuits and after a proper relativity time delay the signal components are summed to reproduce the original data signal.

In accordance with the invention the plurality of signal components may be processed with channel spatial matching required only in the recording of the signal components due to a unique interleaved recording technique that allows data retrieval by a single readout scanner. All other known techniques require a plurality of readout scanning devices for simultaneous data retrieval. Registration errors are greatly increased upon readout of the plurality of signal components with multiple readout devices since each independent readout systems have to be spatially aligned and synchronized to very fine tolerances. For applications that require spatial registration in the order of a fraction of the overall system impulse response, the required tolerances for multiple readout devices alignment are practically impossible to achieve.

It is therefore an object of the present invention to provide analogue storage and processing systems for the storage, retrieval and processing of a plurality of signal components with a minimum of distortion.

Another objective is to provide a system for the storage, retrieval and processing of a plurality of signal components that incorporates an interleaved record pattern that allows utilization of a single readout device to minimize mis-registration between signal component channels.

BRIEF DESCRIPTION OF THE DRAWINGS

FIG. 1 is a block diagram illustrating an analogue storage and processing system in accordance with the principles of this invention.

FIG. 2 is a schematic and block diagram of a suitable signal source, record controller, and record unit for the system of FIG. 1.

FIG. 4 is a schematic and block diagram of a suitable readout processor, analyzer and display unit for the system of FIG. 1.

FIGS. 5, 6, 7, 8, and 9 are voltage vs time diagrams for explaining the operation of the system in accordance with the invention.

FIGS. 10 and 11 are diagrams depicting the record and readout film patterns, respectively.

DESCRIPTION OF THE PREFERRED EMBODIMENT

Figure 3:
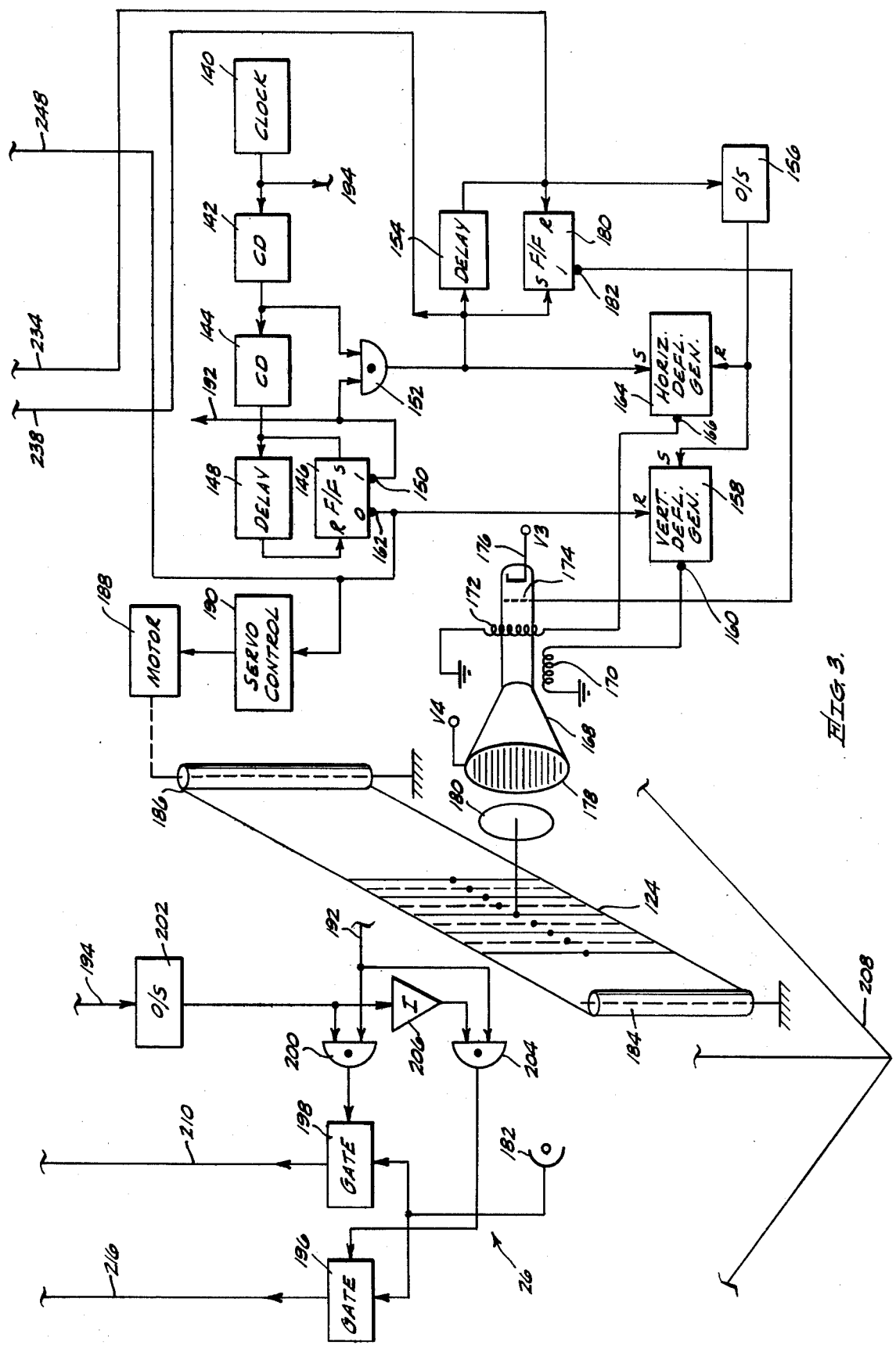
FIG. 3 is a schematic and block diagram of a suitable readout unit for the system of FIG. 1.

Referring first to the system in accordance with the invention, as shown in FIG. 1, a signal source 20 which may be a pulse doppler radar, for example, develops in-phase and quadrature input signal components. The signal components are applied to a record unit 22 wherein they are individually recorded in an interleaved pattern along a first dimension of a storage medium (not shown in FIG. 1). The signal source 20 and the record unit 22 may be synchronized by a record controller 24 so that the distance along the first dimension of the storage medium corresponds to radar range. The storage medium is scanned by a readout unit 26 in a direction transverse to the first dimension to develop in-phase and quadrature read signals representative of the doppler history of the in-phase and quadrature input signal components at successive range intervals. The in-phase and quadrature read signals are applied to a readout processor 28 wherein these signals, after suitable relative delay and quadrature modulation processing, are summed to reproduce the information contained in the original input signal. The output signals produced by readout processor 28 may be applied to banks of narrow band doppler filters (not shown in FIG. 1) of the analyzer 30. The analyzer filter banks are sampled sequentially in synchronism with display sweeps of a display unit 32 and the sample signals from analyzer 30 are applied to display unit 32 for presentation as a function of the input signals relative frequency (velocity) and timing (range).

Readout unit 26 also develops timing pulses for synchronizing the readout processor 28, the analyzer 30 and display unit 32 with the readout scan of the readout unit 26.

Although the signal source 20 was selected as a pulse doppler radar in the preferred embodiment, it will be readily apparent that the analogue storage and processing system of the invention may be utilized in any signal processing application where it is desirable to store a plurality of serial data components and to readout and process data in a parallel format.

The signal source 20, the record unit 22 and the record controller 24 are shown in greater detail in FIG. 2. Referring now to FIG. 2, the record controller 24 includes a conventional record clock 34 that generates continuous series of synchronization pulses. The record clock pulses may be 100 nano-seconds (n-sec) wide, and the clock's repetition rate may be 50,000 cycles per second, for example. A conventional countdown circuit 36 is coupled to the clock 34 and the countdown circuit produces pulses at a fixed sub-multiple of the clock's repetition rate, for example the countdown circuit may divide the clock pulses by 50,000. The output pulses of the countdown circuit 36 hereafter referred to as the "start record pulses" are applied to a set input terminal of a conventional flip-flop 38. Upon application of the "start record pulses", the output level of an output terminal 40 of the flip-flop 38 is switched to a high voltage level. The "start record pulses" also are applied to conventional pulse delay circuit 41 which in response thereto and after a suitable delay of, for example one milli-second (m-sec), generates an output pulse herein referred to as the "end record" pulse which is applied to a reset input terminal of the flip-flop 38. In response to the "end record" pulse the signal at the output terminal 40 of flip-flop 38 is switched to a low voltage level. The synchronization pulses from the clock 34 and a gating signal from terminal 40 of the flip-flop 38 are applied to an AND gate 42. The output signal from the AND gate 42 (transmitter synchronization signal) is composed of series of clock pulses during the record time period only and is at a low signal level during the film drive time period. The record time period is the time interval following a "start record" pulse and preceding the next "end record" pulse. The film drive period is the time interval following an "end record" pulse and preceding the next "start record" pulse.

The transmitter's synchronization signals from the AND gate 42 are applied to, and controlled by, a conventional gating circuit 44 of the signal source unit 20. During the period that the transmitter synchronization signals are at the high level (the time period that the clock pulses are present during the record interval) the gate 44 applies RF (radio frequency) energy pulses to a RF power amplifier 46 which may be a conventional power klystron or a cross-field amplifier. The RF pulses are applied to the gate 44 from an output terminal of a mixer 48 that has a conventional RF local oscillator 50 coupled to one input terminal and an IF (intermediate frequency) oscillator 52 coupled to a second input terminal. The output signal from mixer 48 varies at a frequency which is equal to the sum of the frequencies of the local oscillator 50 and the IF oscillator 52. After amplification by the RF power amplifier 46, the RF energy pulses are transmitted through a conventional duplexer 54 to an antenna 56 and then radiated into space.

A portion of the transmitted energy which is reflected from a target will be intercepted by the antenna 56 and applied through the duplexer 54 to a signal input terminal of a mixer 58. The local oscillator 50 is coupled to a second input terminal of the mixer 58 and the mixer's output terminal is coupled to a conventional IF amplifier 60. The output signal of the IF amplifier 60 is applied in parallel to a pair of identical phase detectors 62 and 64. The IF oscillator 52 is coupled directly to the phase detector 62 and is also coupled through a conventional phase shifter 66, which may be for example a 90 degree phase shifter, to the phase detector 64. The output signal of the phase detector 62 herein referred to as "in-phase" video is coupled to an intensity grid 68 of a conventional cathode ray tube 70; cathode ray tube 70 being a sub-unit of the record unit 22. The output signal of the phase detector 64 herein referred to as "quadrature" video is coupled to an intensity control grid 72 of a cathode ray tube 74.

A vertical deflection coil 80 of the cathode ray tube 70 has one terminal connected to ground and a second terminal coupled to an output terminal 84 of a vertical deflection generator 86. A horizontal deflection coil 76 of the cathode ray tube 70 has one terminal connected to ground and a second terminal coupled to an output terminal 88 of a horizontal deflection generator 90. A vertical deflection coil 82 and a horizontal deflection coil 78 of the cathode ray tube 74 are connected in an identical manner as that just described for the vertical and horizontal coils respectively of the cathode ray tube 70.

The transmitter synchronization pulses are applied from the AND gates 42 to a trigger input terminal 92 of the vertical deflection generator 86. In response to these gated clock pulses applied to the input terminal 92, the vertical deflection generator 86 produces a ramp type deflection signal at the output terminal 84. The transmitter synchronization pulses are also applied through a delay circuit 94 to a reset terminal 96 of the vertical deflection generator 86. In response to the pulses applied to terminal 96, the vertical deflection generator clamps the deflection signal at the terminal 84 to a reference potential level. The fixed delay period of the delay circuit 94 may be equal to the period between clock pulses minus 150 nano-seconds, for example, so that the deflection circuit is reset just prior to the start of the next vertical deflection signal.

The horizontal deflection generator 90 may include a conventional integrator circuit (not shown) that produces a stair-step type output deflection signal by integrating the delayed transmitter synchronization pulses applied from the output terminal of the delay circuit 94. The signal at a terminal 98 of the flip-flop 38 is applied to a reset terminal of the horizontal deflection generator 90 to reset the deflection signal to a reference potential during the film drive time period. The signal at the terminal 98 of the flip-flop 38 is the complement of the signal described previously at the terminal 40.

The terminal 98 of flip-flop 38 is coupled to a conventional inverting amplifier 100 and the output of the inverter 100 is coupled to a negative logic OR gate 102. The output terminal of the delay circuit 94 is coupled to an inverter amplifier 104 and the output thereof is coupled to a second input terminal of the OR gate 102. The OR gate 102 applies a negative output pulse to the conventional pulse amplifiers 106 and 108 when either of the input signals applied thereto are negative. The output of the amplifier 106 is coupled to the intensity control grid 68 of the cathode ray tube 70 and the output of the amplifier 108 is coupled to the intensity control grid 72 of the cathode ray tube 74. The output signals of amplifiers 106 and 108 provide blanking of the cathode ray tubes' electron beams during the retrace period of the horizontal and vertical deflection signals.

The cathodes 114 and 116, of the cathode ray tubes, are coupled in parallel to a suitable source of negative DC (direct current) potential V1 and display screens 110 and 112 are coupled in parallel to a suitable source of positive DC potential V2.

The light energy emitted from the display screen 110 of the quadrature video cathode ray tube 74 is turned by a mirror 118 and reflected to one side of a conventional optical beam splitter 120. The beam splitter 120 reflects the light energy from the cathode ray tube 74 through an optical focusing lens 122 to a photographic film 124. The light energy from the in-phase cathode ray tube 70 is passed through the beam splitter 120, focused by the lens 122 and then directed to the photographic film 124. Cathode ray tubes 70 and 74 are mounted in the same plane and located relative to the mirror 118 and the beam splitter 120 so that a given vertical intensity line, in the same relative location on the two cathode ray tubes, will be recorded on the film 124 as slightly separated parallel lines (interleaved recording pattern). For example in FIG. 2 the center vertical lines on the screens of the in-phase and quadrature cathode ray tubes are labeled 126I and 126Q, respectively, and they produce information storage lines 126IF and 126QF, respectively, on the film 124.

The storage film 124 is suitably arranged between the take-up reel 128 and a storage reel 130, and the reel 128 is mechanically driven by a suitable motor 132 in response to an output voltage provided by an electronic servo control unit 134. The input signal to the servo control unit 134 is applied from the terminal 98 of filp-flop 38, and as was explained previously, the signal (the film drive signal) is at a high voltage level during the film drive period, i.e., the time period between transmitter bursts of RF energy pulses. In response to the film drive signal the servo control unit 134 and the motor 132 mechanically drives the take-up reel 128 to advance the film 124 one frame. A film frame is that film distance required to store the total number of vertical lines written on cathode ray tubes 70 and 74 in an interleaved pattern and will be explained in greater detail subsequently.

Record unit 22 is enclosed in a box type structure 136 to exclude extraneous light from affecting the film.

Next the readout unit 26 will be explained in further detail with reference directed to the circuits shown in FIG. 3. A read clock 140 generates synchronization pulses which may be 100 nano-seconds wide and have a clock repetition frequency of two megacycles for example. The read clock pulses may be divided by a factor, of 200 for example, by a conventional countdown circuit 142 and then further divided by a factor of 100,000 for example by a combination of countdown circuits 142 and 144. The output pulses of the countdown circuit 144 (start read pulses) are applied to a set input terminal of a flip-flop 146. The start read pulses are also applied to a delay circuit 148 that delays the pulses for a period equal to the time required to read out one film frame, for example 20 milli-seconds, and are then applied to a reset input terminal of the flip-flop 146. The output signal at a terminal 150 of the flip-flop 146 will be at a high level voltage state during the film readout period and at a zero voltage level state during the readout film drive period. The film readout period is the time interval following a start read pulse and preceding the next pulse generated by the delay unit 148 (end read pulse). The readout drive period is the period following an end-read pulse and preceding the next start read pulse.

Terminal 150 of the flip-flop 146 is coupled to one input terminal of an AND gate 152 and the output terminal of the countdown circuit 142 is coupled to the other input terminal of the AND gate 152. The output signal of the AND gate 152 is delayed by a delay circuit 154 and then applied to a one-shot (monostable multivibrator) circuit 156. A vertical deflection generator 158 integrates the output pulse applied from the one-shot circuit 156 to develop a stair-step type vertical deflection signal at an output terminal 160. An output signal at a terminal 162 of the flip-flop 146, which is the complement of the signal described previously at the terminal 150, is applied to a reset terminal of the vertical deflection generator 158. In response to this reset signal the vertical deflection signal at the terminal 160 is clamped to a reference potential level. The output signal of the AND gate 152 is also applied to a set input terminal of a horizontal deflection generator 164. In response to the signal applied to the set input terminal, the horizontal deflection generator 164 produces a ramp type deflection signal at an output terminal 166. The horizontal output signal is reset to a reference potential by the signal applied to the horizontal deflection generator 164 from the one-shot circuit 156.

The output terminal 160 of the vertical deflection generator 158 is coupled to one terminal of a vertical deflection coil 170 of a cathode ray tube 168 and the other terminal of the vertical deflection coil 170 is coupled to ground. The output terminal 166 of the horizontal deflection generator 164 is coupled to one terminal of a horizontal deflection coil 172 and the other terminal of the horizontal deflection coil 172 is coupled to ground. A cathode 176 of the cathode ray tube 168 is coupled to a suitable source of negative DC potential V3 and a display screen 178 is coupled to a suitable source of positive DC potential V4.

The output signal from the AND gate 152 is applied to a set input terminal of a flip-flop 180 and the output signal from the delay circuit 154 is applied to a reset terminal of the flip-flop 180. The output signal at a terminal 182 is at the high level voltage state during the time period after the application of the signal to the set input terminal and prior to the application of the signal to the reset terminal. The terminal 182 is coupled to a control intensity grid 174 of the cathode ray tube 168 and in response to this signal the cathode ray tube's electron beam is cut off except during horizontal readout periods.

In response to the cathode ray tube's 168 deflection and intensity signals, the mechanization of which were just described, the tube's electron beam scans a plurality of horizontal intensified lines on the display surface 178. The light emitted from the display surface is focused by the optical lens 180 and directed towards the photographic film 124. As was described previously, the film 124 was exposed during the record sequence so that its transmissibility to light after being developed varies in accordance with the amplitude variations of the received radar signals. Consequently the constant intensity light beam that is applied through the optical lens 180 is modulated by the transmission variation of the film 124 prior to striking a photomultiplier tube 182 located on the opposite side of the film from the cathode ray tube 168.

The film 124 is suitably mounted on a storage reel 184 and a take-up reel 186. The take-up reel 186 is mechanically driven by a motor 188 in response to signals supplied by an electronic servo control unit 190, and the electronic servo control unit 190 is coupled to the output terminal 162 of the flip-flop 146. In response to the signal applied to the terminal 162, the servo control unit 190, the motor 188 and take-up reel 186 causes the film 124 to advance one frame.

The output signal of the photomultiplier tube 182, which is modulated in accordance with the transmissibility pattern of the film 124, is applied in parallel to a pair of gating circuits 196 and 198. The gating circuit 198 is controlled by the output signal of an AND gate 200. One input signal to the AND gate 200 is applied to the terminal 192 from the output terminal 150 of the flip-flop 146. The other input signal to the AND gate 200 is applied from a one-shot circuit 202 which is triggered by the clock pulses which are coupled to an input terminal of the one-shot 202 from the clock 140 through a terminal 194. The pulse width of the signal produced by the one-shot 202 may be one-half of the time interval between read clock pulses. The gate circuit 196 is controlled from the output of an AND gate 204. One input signal to the AND gate 204 is applied from the terminal 192 and the other input signal to the AND gate 204 is applied from the output terminal of a conventional inverter circuit 206. The output of the one-shot circuit 202 is applied as the input signal to the inverter circuit 206.

The elements 168, 180, 124 and 182 are enclosed in a box type structure 208 to prevent extraneous light from interfering with the readout signals generated by the photomultiplier tube 182.

The in-phase video readout signal at an output terminal of the gate 196 is applied through a terminal 216 and through a delay line 212 (FIG. 4) to a mixer 218. The quadrature video readout signal at the output terminal of the gate 198 is applied through a terminal 210 to a mixer 214 (FIG. 4).

Referring now principally to FIG. 4 an IF oscillator 220 is coupled to the in-phase mixer 218 and is also coupled through a phase shifter 222 to the quadrature mixer 214. The output signals from the mixers 218 and 214 are summed in a conventional video summation circuit 224 and are then applied in parallel to a plurality of output doppler channels 1 through N. Each of the doppler channels includes a doppler filter, such as the filter 226, coupled through a clamp circuit, such as 228, to a detector such as 230, and the output of the detector is applied to a gate circuit such as 232. The doppler filter may be any conventional suitable type such as described in the text "Introduction To Radar Systems" by M. I. Skolnik, (1962) McGraw Hill Publishing Co., New York, New York. The detectors may be of the conventional video type and the gate and clamp circuits may be comprised of a suitable electronic switching circuits such as transistor switching gate as are well known in the art. The clamp circuits may be a gate which in response to a gating signal couples the filter output to ground so that residual oscillations in the filters will be damped out in preparation for the next sequence of input data signals. The gate circuits 1 through N are controlled by signals received from output terminals 1a through Na, respectively, of a conventional ring counter 236. The end horizontal read pulse applied through a terminal 234 (FIG. 3) triggers the ring counter 236 which in response thereto applies a positive signal to a single output terminal, such as the terminal 1a, for a selected time period. Next a positive signal is then applied exclusively to an output terminal 2a for the same selected time period, and this operating sequence continues towards the output terminal Na. A detailed description of the operation of the ring counter may be found in a text authored by R. K. Richards, entitled "Arithmetic Operations In Digital Computers," 1955, published by Van Nostrand, Library of Congress identification QA76.R5. The clamp circuits 1 through N are gated in response to start horizontal readout pulses that are applied in parallel thereto through a terminal 238 (FIG. 3).

The output signals from the doppler channel gates 1 through N are applied in parallel to an intensity input terminal 240 of a display monitor 242 which is a sub-element of the display unit 32 (FIG. 1).

A horizontal deflection output signal is applied to a horizontal deflection input terminal 243 of the display monitor 242 from a horizontal sweep generator 244. Start horizontal read pulses applied from the terminal 238 triggers a one-shot circuit 246 that in response thereto produces constant width output signals that are applied to the horizontal sweep generator 244. Horizontal sweep generator 244 may include a conventional electronic integrator which integrates the output pulses of the one-shot generator 246 to produce a stair-step type deflection signal that is reset to a reference potential level in response to the end of frame signal that is applied through a terminal 248 (FIG. 3).

A conventional vertical sweep generator 250 is triggered by the end horizontal read pulses applied from the terminal 234 and in response thereto generates a ramp type vertical deflection signal that is applied to a vertical deflection input terminal 252 of the display monitor 242.

The operation of the system of FIG. 1 will now be explained with reference first directed primarily to FIGS. 2, 5, and 6. The record clock 34 (FIG. 2) produces series of pulses which may have a pulse width of 100 nano-seconds and a time separation between pulses of 20 microseconds, ($\mu$ sec), as shown by a waveform 260 of FIG. 5. However it should be noted that the timing shown in the figures herein are for the purposes of explanation only and that any suitable time base may be utilized in accordance with the principles of the invention. The clock pulses generated by the record clock 34 are counted down by the countdown circuit 36 which may divide the clock pulses by a factor of 50,000 for example. The output signals of the countdown circuit 36, referred to as "start record" pulses, are shown by a waveform 262 of FIG. 6 as a series of narrow pulses separated by a time interval of one second for example. These "start record" pulses are applied to a set input terminal of the flip-flop 38 and are also applied after a suitable delay, for example a time delay of one milli-second, to a reset terminal of the flip-flop 38. The output pulses of the delay circuit 41 are referred to as "end record" pulses and are shown by a waveform 264 of FIG. 6. The output signal at a terminal 40 of the flip-flop 38 (waveform 266 of FIG. 6) may be a series of one milli-second wide pulses separated by one second. The signal at the output terminal 40 of the flip-flop 38 is combined in the AND gate 42 with the clock pulses and the output signal of the AND circuit 42, (transmitter synchronization pulses) are applied to a gating input terminal of the gate 44. The input signal to the gate 44 is applied from a mixer 48 and is composed of the sum of the signals from the local oscillator 50 ($f_{Lo}$) and the IF oscillator 52 ($f_{If}$) and the frequency of the signal will be $f_{Lo}$ plus $f_{If}$. The output of the mixer 48 is gated in response to the transmitter synchronization pulses in the gate 44 and then applied to the RF power amplifier 46 wherein the power level of these signals is amplified prior to being transmitted by the duplexer 54 to the antenna 56. The antenna 56 transmits the RF signals generated by the power amplifier 46 into space, and intercepts a portion of the energy that is reflected by targets.

The energy received by the antenna 56 is at a frequency $f_{Lo}$ plus $f_{If}$ plus $f_t$ where $f_t$ is the variation from the transmitted frequency due to the familiar doppler phenomena resulting from relative motion between the antenna 56 and the target. This shift in the received frequency, $f_t$, may be mathematically described as $f_t$ is equal to $2V/\lambda$ where V is the relative velocity between the antenna 56 and target and $\lambda$ is the wavelength of the transmitted energy.

The received energy after being focused by the antenna 56 is transmitted by the duplexer 54 to the mixer 58 wherein it is hetrodyned with the signal generated by the local oscillator 50. The output signal of the mixer 58 is amplified in the IF amplifier 60 and then applied in parallel to the inphase phase detector 62 and the quadrature phase detector 64. Phase detector 62 compares the received signal against a reference signal that is applied directly from the IF oscillator 52 and the output signal of the phase detector 62 is coupled to the intensity control grid 68 of the display tube 70 to control the intensity of the electron beam and therefore the light intensity emitted by the screen 112 of the cathode ray tube 70. The signal from the IF oscillator 52 is also applied to the phase shifter 66 wherein the signal is phase shifted, for example 90 degrees, and then applied as a reference for the phase detector 64. The output of the phase detector 64 is applied to the control intensity grid 72 of the cathode ray tube 74.

The position of the electron beams of the cathode ray tubes 70 and 74 are controlled in parallel by the vertical deflection generator 86 and the horizontal deflection generator 90. The vertical deflection generator 86 produces ramp type vertical deflection signals as shown by a waveform 268 of FIG. 5. The vertical deflection generator 86 is triggered by the signals coupled to the terminal 92 thereof from the output of the AND gate 42. These signals, referred to as transmitter synchronization signals, are composed of bursts of clock pulses as shown by the waveform 260 of FIG. 5 superimposed on the output signal of the flip-flop 38 as shown by the waveform 266. The vertical deflection signal is reset to a reference potential during the time occurrence of delay clock pulses that are applied to the terminal 96 of the vertical deflection generator 86. The delay clock pulses are developed by the delay circuit 94 and are shown by the waveform 270 of FIG. 5. Horizontal deflection signals for the cathode ray tubes 70 and 74 are supplied by the horizontal deflection generator 90 which intergrates the delayed clock pulses of the waveform 270 of FIG. 5. The horizontal deflection signal at the terminal 88 is a stair-step type deflection signal of a waveform 272 (FIG. 5). The generator 90 integrates the delayed clock pulses so that there is a change in the horizontal deflection voltage only at the end of a received time period and prior to the next transmit time period. The horizontal deflection generator continues to integrate the delayed clock pulses until the end of a frame period at which time the horizontal deflection generator is reset by the output signal at the terminal 98 of the flip-flop 38 which is shown by the waveform 274 of FIG. 6.

The electron beams of the cathode ray tubes 70 and 74 are blanked during the retrace period of the horizontal and vertical deflection signals. The vertical blanking signal is developed by inverting the delayed clock pulses in the inverter 104 and is shown by a waveform 276 of FIG. 5. The horizontal blanking signals as shown by the waveform 274 of FIG. 6 are developed by the inverter 100 which reverses the polarity of the signal at the terminal 98 of the flip-flop 38. The vertical and horizontal blanking signals are applied to the negative OR gate 102 that produces a negative output pulse during the time period that either of its input signals are negative. The output of the negative OR gate 102 is amplified by the amplifier 108 and then applied to the intensity controlled grid 72 of the cathode ray tube 74. Also the output of the negative OR gate 102 is amplified by the amplifier 106 and then applied to the intensity control grid 68 of the in-phase cathode ray tube 70.

The just described operation of the record controller 24 and the signal source 20 results in the intensity and position control of the electron beams of the cathode ray tubes such that the in-phase and quadrature doppler target signals are recorded in vertical light modulated lines on the cathode ray tubes' display surfaces 110 and 112. For example the first transmitted pulse of a record frame may be written on the left extreme of the display tube and the returns from each successive transmitted pulse may be written in lines stepped to the right horizontally. Each vertical line records the doppler history of the return signal of a single transmitted pulse as a function of range. For example the shortest target range would be recorded at the bottom of the cathode ray display screen and the longest target range at the top of the display screen.

The in-phase target signals are recorded on the cathode ray tube 70 and are shown as solid vertical lines in FIG. 2 for purposes of explanation. The quadrature target signals are recorded in corresponding positions on cathode ray tube 74 and are represented by dash lines on the display surface thereof. The light produced by the display surface of the cathode ray tube 74 is reflected by the mirror 118 through the optical beam splitter 120 and the lens 122 to the recording film 124. Beam splitter 120 also directs the light produced by the cathode ray tube 70 to the lens 122 that focuses it on the film 124.

The received video signals are therefore recorded line by line in an interleaved pattern where the in-phase and quadrature video signals from a given transmitted pulse are recorded side by side. For example the central line labeled 126I and 126Q would be recorded at lines 126IF and 126QF on the film 124 of FIG. 2. FIG. 10 more clearly shows the recording pattern and by way of explanation, the intensity modulation of film 124 is depicted for one range interval as circular dots of varying size. It may be noted from FIG. 10 that the variation in the dot size (which for purposes of explanation represents the variation in the degree of light exposure of a series of range intervals) is a function of time following a sinusoidal pattern at the target's doppler frequency and that the in-phase and quadrature signals vary at the same frequency but with a 90 degree relative phase difference.

At the end of a record frame, which may be fifty transmitted pulses for example, the horizontal deflection signals to the cathode ray tubes is reset to the right hand extreme and the film 124 is advanced one frame-width in response to the output signal at the terminal 98 of the flip-flop 38.

Now that the operation of the record portion of the system in accordance with the invention has been described, the operation of the readout unit 26 will be explained with reference primarily directed to FIGS. 3, 7, 8, 9, and 11. The exposed film 124, after being developed, is installed and aligned on the storage and take-up reels 184 and 186, respectively, of FIG. 3. A flying spot scanner (cathode ray tube 168) produces a light beam that is focused by the lens 180 onto the film 124. The light beam is swept in a direction transverse to that of the recording sequence so as to readout the target's doppler history for one given range interval at a time. Next, the readout beam is stepped to an adjacent range interval and the operational sequence continues until the entire film frame has been read out, for example from minimum to maximum range (i.e., from the bottom to the top of the film 124).

Figure 7:
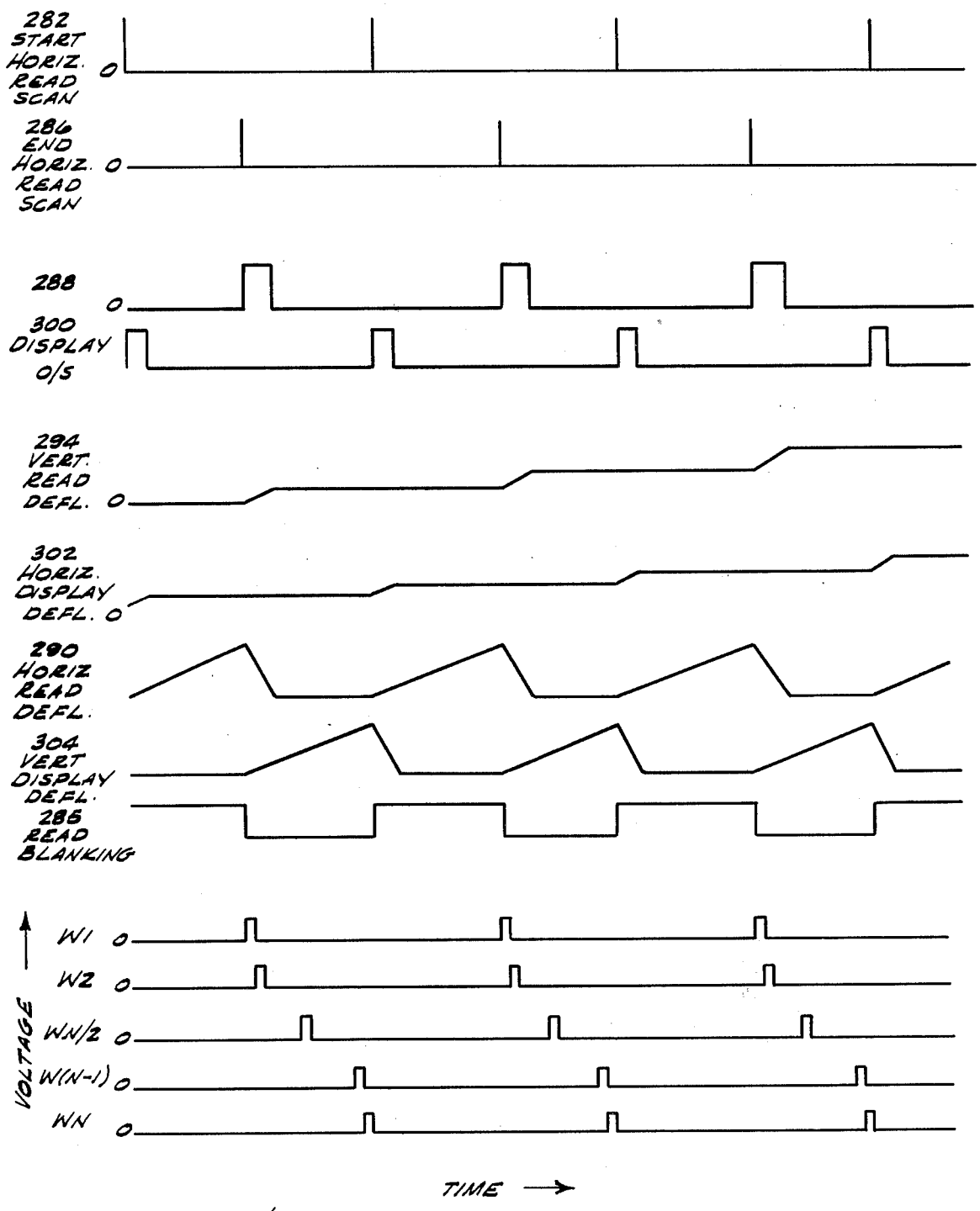

The read clock 140 generates clock pulses, shown by a waveform 280 of FIG. 8, and these clock pulses are divided by the countdown circuit 142 to produce the start record horizontal scan signals shown by a waveform 282 of FIG. 7. The start horizontal read scan signals are further divided by the countdown circuit 144 and are then applied to the flip-flop 162 to produce the vertical read signals shown by a waveform 284 of FIG. 9. The start horizontal read scan signals and the vertical read signals are combined in the AND gate 152 and then after a delay of one-half the inter-pulse period thereof, for example, are applied to the one-shot circuit 156. The output signal of the delay circuit 154 (end horizontal read scan signals) are shown by a waveform 286 and the output signals of the one-shot 156 are shown by a waveform 288 of FIG. 7.

The horizontal deflection generator 164 is triggered by the output signals of the AND gate 152 and is reset by the output signals of the one-shot circuit 156. The horizontal read deflection signal produced at the output terminal 166 is shown by a waveform 290 of FIG. 7.

The vertical deflection generator 158 is triggered by the output signals from the one-shot circuit 156 and are reset by the output signals applied from the terminal 162 of the flip-flop 146. The signals at the terminal 162 are depicted by a waveform 292 of FIG. 9, and the vertical deflection signal at the output of the vertical deflection generator 158 is shown by the waveform 294 of FIG. 7.

The flip-flop 180 is set by the output signal applied from the AND gate 152 and is reset by the end horizontal scan pulses to produce the readout blanking signals shown by the waveform 285 of FIG. 7.

The light beam emitted by the cathode ray tube 168 is modulated by the varying transmissibility of the film 124 in accordance with the recorded target doppler history. This modulated light beam is converted to electrical signals by the photomultiplier tube 182 and then applied to the in-phase and quadrature gates 196 and 198 respectively.

The gating signals applied to the gates 196 and 198 are shown by waveforms 296 and 298, respectively. The relationship between the read clock pulses (waveform 280) the gate pulses (waveforms 296 and 298) and the recorded film data pattern may be more clearly comprehended by observing the relative timing and positioning between the waveforms of FIGS. 8 and 11. FIG. 11 shows the relative positioning of the in-phase and quadrature data for a particular recording frame where solid lines represent the in-phase data and dash lines represent quadrature data and the lines 1 and 2 could be data lines from the first transmitted pulse of the frame and the lines 99 and 100 could be data lines from the last transmitted pulse of the frame.

The output signal of the gate 196 is delayed an amount proportional to the readout time between the data lines on the film 124. For example the data from line 1 (FIG. 11) will be delayed until the readout time of occurrence of the data of line 2. The output of the delay circuit 212 (FIG. 4) is modulated by the mixer 218 in response to a signal supplied from the oscillator 220, and the output signal from the gate 198 is modulated in the mixer 214 in response to the phase shifted output of the oscillator 220. The output signal from these mixers are summed and then applied in parallel to the banks of doppler filters 1 through N. Each doppler filter channel 1 through N is interrogated sequentially in response to gate pulses generated by the ring counter 236. The ring counter 236 is triggered by the end horizontal read scan pulse shown by the waveform 286 (FIG. 7) and in response thereto develops gating signals at output terminal 1a, 2a Na/2, (Na−1) and Na as shown by the waveforms W1, W2, WN/2, W(N−1) and WN, respectively, of FIG. 7. It may be noted from FIG. 7 that the output gating pulses generated by the ring counter 236 occur during the time period between horizontal readout scans of the flying spot scan recorder 168. Also the end horizontal readout scan pulses are used to trigger the vertical sweep generator 250 of the display unit 32 so that the vertical deflection sweep of the display unit (waveform 304 of FIG. 7) is synchronized with the start of the interrogation sequence of the doppler channels 1 through N. The doppler filters 1 through N are selected so that their center frequencies increase sequentially and therefore the targets will be displayed in a vertical direction on the display unit as a function of target velocity.

The output signals from the AND gate 152 of FIG. 3 are applied to the clamp circuits 1 through N of the doppler channels so that each doppler filter is clamped to ground potential at the start of each horizontal readout scan of the film 124. Also the output signal of the AND gate 152 is used to trigger the one-shot circuit 246 (FIG. 4). The output signal from the one-shot circuit 246 is applied to the horizontal sweep generator 244 and is shown by a waveform 300 of FIG. 7. The horizontal sweep generator 244 integrates the output pulses from the one-shot 246 to produce a horizontal display deflection signal shown by the waveform 302 of FIG. 7. The horizontal sweep generator 244 is reset at the end of a given readout frame by the signal applied from the output terminal 162 of the flip-flop 146 (FIG. 3) and this signal is also used to energize the motor 188 that advances the film 124 to the next frame position.

Referring now to the display monitor 242 of FIG. 4, the timing sequence just described produces a horizontal deflection signal for the display unit that advances the electron display beam in steps horizontally at the end of each horizontal readout scan of the film 124. At the end of each horizontal readout scan of the film 124 the doppler filters 1 through N are sampled in sequence and when the output signal of a given doppler filter contains sufficient target energy to exceed the display threshold level the signal is displayed in the vertical dimension as a function of the relative target's velocity and in the horizontal dimension as a function of relative target range.

Although only one embodiment of the invention has been described herein it will be appreciated by those skilled in the art that other arrangements may be used in accordance with the principles of the invention. For instance, the record unit 22 and the readout unit 26 of FIG. 1 could include an electronic storage tube with a plurality of write guns instead of the optical photographic means described herein. Also, although the signal source 20 was selected as a pulse doppler radar in the preferred embodiment, it is readily apparent that the analogue storage and processing system of the invention may be utilized in any signal processing application where it is desired to store a plurality of serial data components and to readout and process data in a parallel format.

Thus has been described an analogue storage and processing system for the storage, retrieval, and processing of a plurality of signal components that incorporates an interleaved record pattern that allows utilization of a single readout device to minimize mis-registration between signal component channels.

What is claimed is:

1. A system for the storage, retrieval and processing of a plurality of signals comprising:
   a signal source for providing a plurality of simultaneously occurring first data signals;
   means, including a storage surface, coupled to said signal source for recording the plurality of first data signals on said storage surface in a spatially interleaved pattern along a first dimension of said storage surface; and
   readout means for scanning said storage surface along a dimension transverse to the first dimension.

2. An analogue storage and processing system comprising:
   a signal source for providing a plurality of simultaneously occurring first signals;
   means, including a storage surface, coupled to said signal source for recording the plurality of first signals on said storage surface in a spatially interleaved pattern along a first dimension of said storage surface;
   a readout unit for scanning said storage surface along a second dimension thereof to sequentially develop gated read signals; and
   a processor coupled to said readout unit and responding to said gated read signals for developing a second signal.

3. An analogue storage and processing system comprising:
   a signal source for providing a plurality of simultaneously occurring first signals;
   a plurality of cathode ray tubes selectively coupled to said signal source, wherein each cathode ray tube responds to a different one of the plurality of first data signals;
   a photographic film;
   a plurality of optical imaging means for transmitting the light energy, from the plurality of cathode ray tubes, in a spatially interleaved pattern along a first dimension of said photographic film;
   a readout unit for scanning said photographic film along a second dimension thereof to sequentially develop gated read signals; and
   a processor coupled to said readout unit and responding to said gated read signals for developing a second signal.

4. The system as set forth in claim 3 in which said readout means includes:
   a flying spot scanner for scanning said photographic film along a second dimension thereof;
   a photomultiplier tube, responsive to the light energy produced by said flying spot scanner and modulated by said photographic film, for developing read signals; and
   a plurality of gating circuits coupled to said photomultiplier tube and to said flying spot scanner for gating the read signals in synchronism with the scan of said flying spot scanner.

5. The system as set forth in claim 2 in which said plurality of simultaneously occurring first signals are signal components of a third signal and said processor includes a plurality of time delay circuits coupled to a summation circuit for producing a second signal.

6. In a target detection system:
   a pulse doppler radar for providing in-phase and quadrature received target video signal components;
   a record unit, coupled to said radar, and including a storage surface for storing the received in-phase and quadrature components in a spatially interleaved pattern along a first dimension of said storage surface;
   a record controller coupled to said radar and to said record unit for providing synchronization therebetween;
   a readout unit for scanning said storage surface along a dimension transverse to the first dimension to produce in-phase and quadrature read signals;
   a processor coupled to said readout unit and responding to the in-phase and quadrature read signals; and
   an analyzer coupled to said processor and to said readout unit.

7. The system as set forth in claim 6 and further including a display unit coupled to said analyzer and to said readout unit for displaying received target energy as a function of target velocity and range.

8. The system as set forth in claim 6 in which said radar includes a pair of quadrature phase detectors.

9. The system as set forth in claim 6 in which said record unit includes:
   in-phase and quadrature cathode ray tubes;
   a photographic film storage surface; and optical imaging means for exposing said photographic film as a function of the light energy produced by said in-phase and quadrature cathode ray tubes.

10. The system as set forth in claim 6 in which said readout unit includes:
   a single flying spot scanner;
   a photomultiplier tube, responsive to the light energy produced by said flying spot scanner and modulated by said storage surface, for developing read signals; and in-phase and quadrature gating circuits coupled to said photomultiplier tube.

11. The system as set forth in claim 6 in which said processor includes a delay circuit for delaying either the in-phase or quadrature read signals and a summation circuit for summing the delayed and undelayed read signal components.

12. The system as set forth in claim 6 in which said analyzer includes a plurality of doppler filter channels that are sequentially interrogated in synchronism with said readout unit.

13. A target velocity determination system comprising:
   a pulse doppler radar for providing in-phase and quadrature received target video signal components;
   a record unit coupled to said radar and including, in-phase and quadrature cathode ray tubes, a photographic film storage surface, and optical imaging means for exposing said photographic film as a function of the light energy produced by said in-phase and quadrature cathode ray tubes in an interleaved pattern along a first dimension of said film;
   a record controller coupled to said radar and to said record unit for providing synchronization therebetween;
   a readout unit including, a single flying spot scanner for scanning the developed film along a dimension transverse to the first dimension to produce in-phase and quadrature read signals, and a photomultiplier tube coupled to in-phase and quadrature gating circuits that produce in-phase and quadrature read signals;
   a processor coupled to said readout unit for summing the respective in-phase and quadrature read signal components;
   an analyzer, coupled to said processor and to said readout unit, and including a plurality of doppler filter channels which are sequentially interrogated in synchronism with said readout unit; and
   a display unit coupled to said analyzer and said readout unit for displaying the received target energy as a function of the target's velocity and range.

* * * * *